April 3, 1962    W. G. WEATHERLY    3,027,784
CHAIN SAW FILING TOOL
Filed June 9, 1958

WILLIAM G. WEATHERLY
INVENTOR.

BY James A. Givnan
ATT'Y

United States Patent Office 3,027,784
Patented Apr. 3, 1962

3,027,784
CHAIN SAW FILING TOOL
William G. Weatherly, 1249 8th St., Clarkston, Wash.
Filed June 9, 1958, Ser. No. 740,698
1 Claim. (Cl. 76—36)

This invention relates broadly to improvements in devices for sharpening saws and specifically to devices for filing the teeth of chain saws.

One of the principal objects of the invention is to provide a device of the character described which is highly portable, of simple, efficient, durable construction, fast and accurate in operation, and adapted to hold different types of files in proper relation to the teeth of the saw at predetermined angles.

Another object of the invention is to provide a chain saw filing device which makes it possible to alternatingly file both the left-facing and the right-facing cutting teeth from one side or the other of the saw bar.

Another object is to provide means to be conveniently gripped by one hand of an operator for securely holding a saw tooth in place while its filing is being accomplished by the other hand.

The foregoing and other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
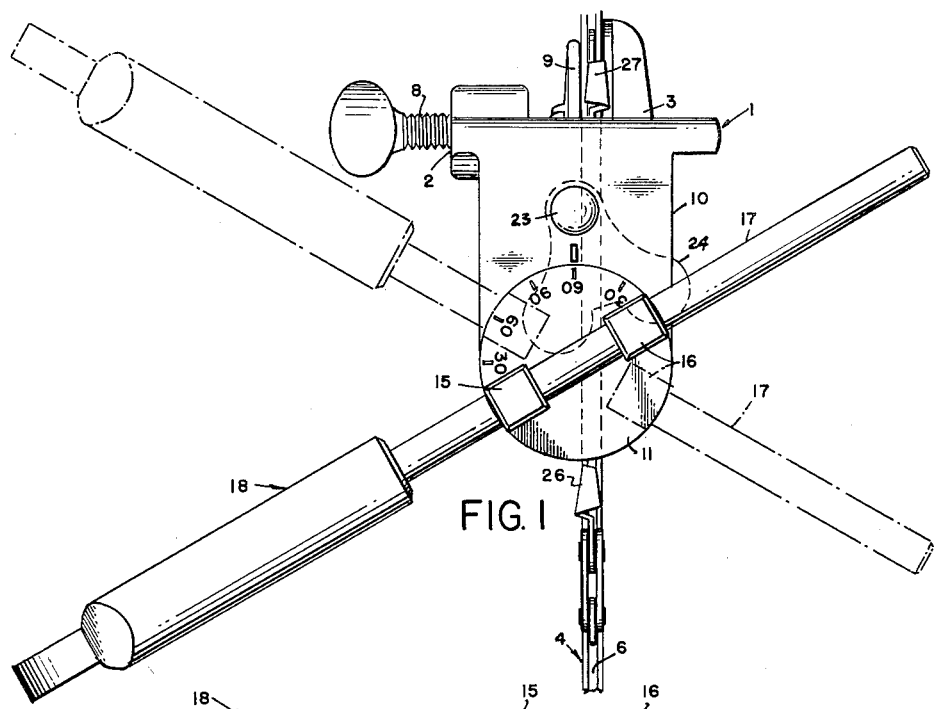
FIGURE 1 is a top plan view of a chain saw filing device made in accordance with my invention and shown removably secured to a fragment of a saw bar.

With continuing reference to the drawing, reference numeral 1 indicates a main body member having legs 2 and 3 adapted to straddle a saw bar 4 and a chain saw 5 carried thereby by means of a slot 6 and chain guides 7 operable in the slot in the conventional manner. The body member is adapted to be removably secured to the saw bar by means of a clamping screw 8 extending through the bottom end of the leg 2 and provided with a clamping disc 9.

Integrated with the top end of the main body member is a horizontal platform 10 upon which at its outer end is pivotally and lockably attached an indexing turret 11 by means, respectively, of a pivot bolt 12 and locking nut 13. Superimposed upon the turret are two diametrically aligned slide bearings 15 and 16, and slidable and laterally swingable in these bearings is a supporting guide rod 17 provided with a handle 18 at one of its ends. The handle is bored inwardly as at 20 from its forward end parallel with the guide rod to receive one end of a file 21 and the top of the bore is of inverted V-shape to automatically align any size file with the guide rod when the file is secured in place by means of a thumb-screw 22.

Swingably attached as at 23 to the underside of the platform 10 at its inner end is a plate 24 of substantially triangular shape and provided with a tooth-engaging and holding lug 25 depending from the center of its base.

Figure 2:
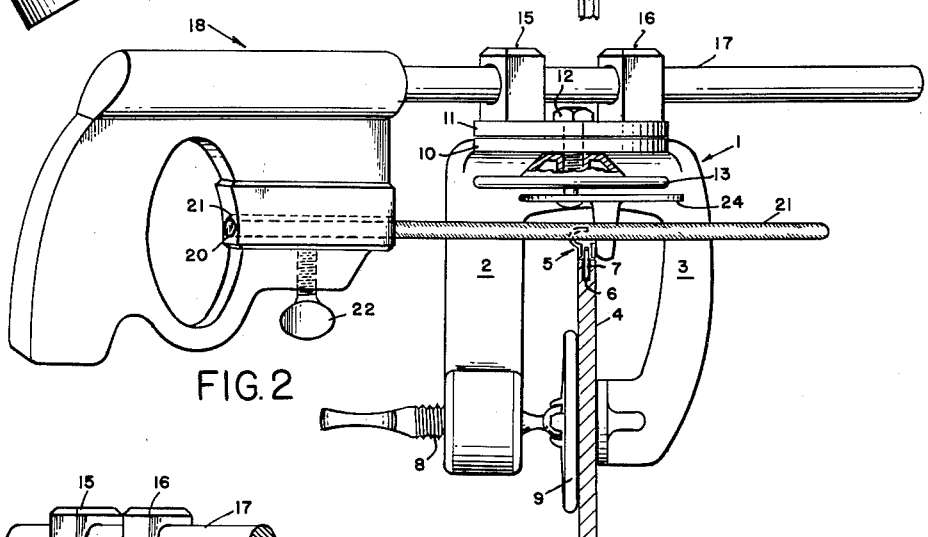
FIGURE 2 is an elevational view of FIGURE 1.
Figure 3:
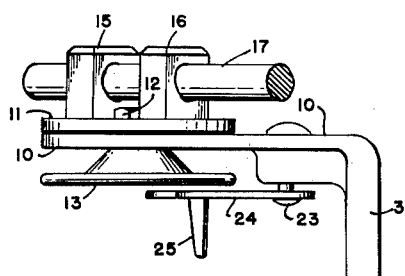
FIGURE 3 is a detail view of the holding means for the saw tooth.

The operation of the device is as follows:

Since the teeth of a chain saw are positioned thereon so that their cutting faces are oppositely disposed in alternate relation to each other, such teeth, for example the right-facing saw teeth 26, may be filed from one side of the saw bar with the guide rod set in the angular position shown in FIGURES 1 and 2; then by swinging the guide rod by means of the turret 11 into the broken line position shown, the left-facing teeth 27 may be filed from the same side of the saw bar.

The main body 1 is first placed over the saw bar 4, as shown, and locked thereto by the clamping screw 8. The turret 11 is then rotated through the desired number of degrees and locked to the platform 10 by means of the locking nut 13. The chain saw is then moved along the groove 6 until the tooth to be filed comes into contact with the file, whereupon the filing is thereafter accomplished by reciprocal motion of the file by one hand of the operator guided by the guide rod 17 in the slide bearings 15 and 16. The other hand of the operator in a natural grip on the platform 10 forces the tooth-engaging lug into engagement with the tooth and by sustained pressure against the tooth binds the tooth guide 7 in the groove 6 and thus holds the tooth securely in position for precision filing.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

A chain saw filing tool comprising a body member having a bifurcated vertical portion adapted to straddle a saw bar and chain saw mounted on the saw bar, said vertical portion integrated at its top end with a horizontal platform extending outwardly therefrom, clamping means carried by the bottom end of said bifurcated portion adapted to engage opposite sides of the saw bar for rigidly mounting the body member to the saw bar, a horizontal circular plate rotatably attached to the outer end of said platform, means carried by the plate and the platform for locking the plate to the platform in rotatably adjusted positions relative thereto, diametrically opposed aligned slide bearings superimposed upon said plate, a guide rod reciprocally slidable and pivotally extending through said bearings, a normally vertically disposed handle secured at its forward top end to said guide rod, a file secured at one of its ends to the bottom portion of said handle in parallel relation to said guide rod whereby the weight of an operator's hand in applying reciprocal motion to the guide rod and file will be borne by the guide bearings and not the file, tooth-engaging means pivotally attached to the horizontal underside of said platform at the inner end thereof, said last mentioned means comprising a plate of substantially triangular shape pivoted at its apex to said platform and provided with a tooth-engaging lug depending therefrom and said lug being thereby swingable into engagement with either side of a tooth being filed, said plate being of a size to protrude from either side of said platform when in a tooth-engaging position and thereby adapted to maintain the lug firmly against a tooth by one hand of an operator in maintaining a grip on said platform and said tooth-engaging means.

References Cited in the file of this patent
UNITED STATES PATENTS

| | | |
|---|---|---|
| 1,323,899 | Mullin | Dec. 2, 1919 |
| 2,495,991 | Speed | Jan. 31, 1950 |
| 2,677,289 | Fitch | May 4, 1954 |
| 2,813,438 | Paradis et al. | Nov. 19, 1957 |
| 2,818,752 | Gramberg | Jan. 7, 1958 |
| 2,896,481 | Hebbert | July 28, 1959 |